UNITED STATES PATENT OFFICE.

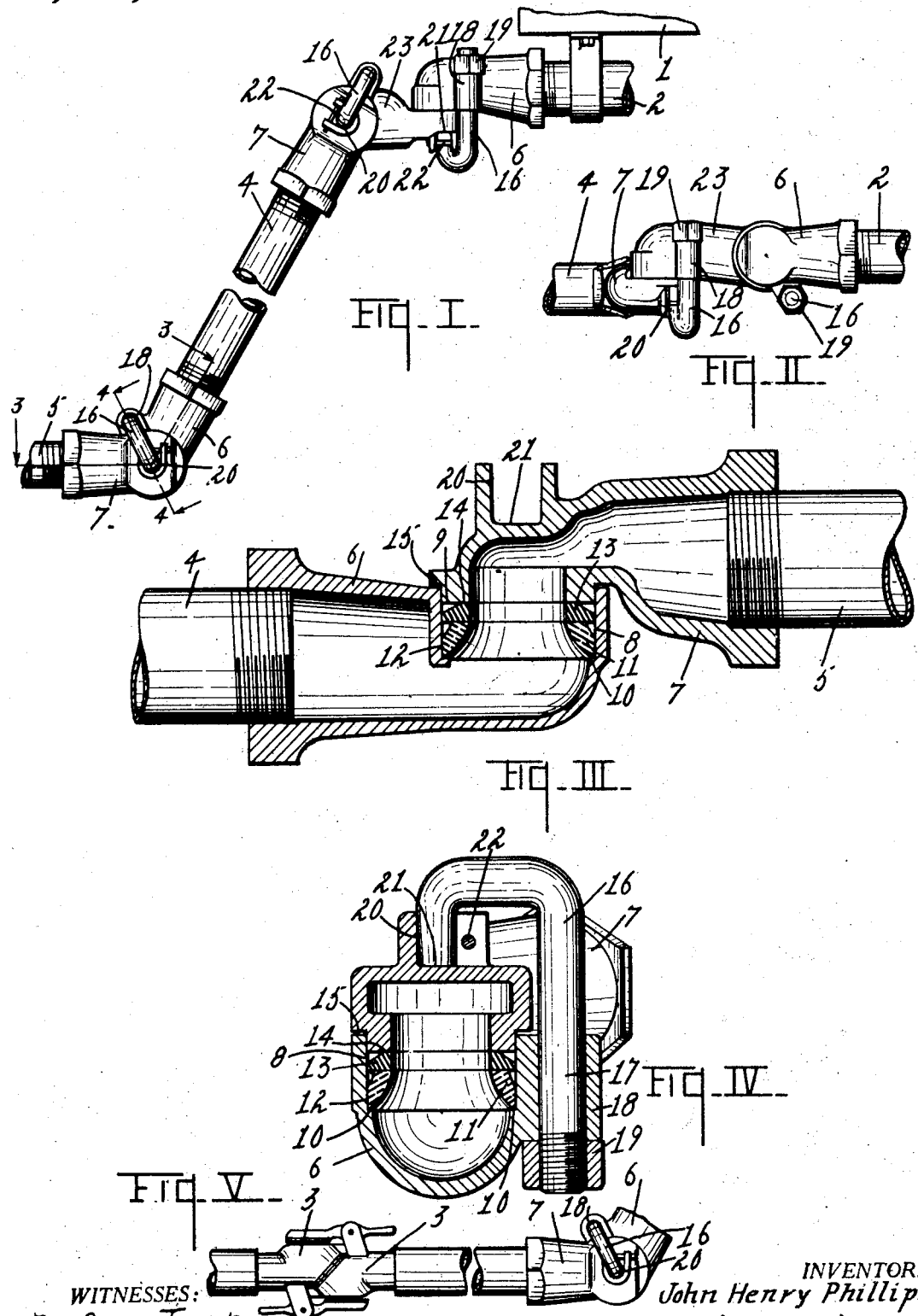

JOHN HENRY PHILLIPS, JR., OF JACKSON, MICHIGAN.

FLEXIBLE PIPE.

1,327,632.   Specification of Letters Patent.   Patented Jan. 13, 1920.

Application filed April 26, 1918. Serial No. 230,862.

*To all whom it may concern:*

Be it known that I, JOHN HENRY PHILLIPS, Jr., a citizen of the United States, residing at Jackson, county of Jackson, State of Michigan, have invented certain new and useful Improvements in Flexible Pipes, of which the following is a specification.

This invention relates to improvements in flexible pipes.

My improvements are particularly designed by me as substitutes for the rubber coupling hose pipes commonly employed on train pipes and in the accompanying drawing I have illustrated my improvements as I have embodied them for that purpose. My improvements are, however, adapted for use in various other relations where flexible or jointed pipe is required.

The main objects of my invention are:

First, to provide an improved flexible pipe adapted for use in train pipes in lieu of coupling hose commonly employed.

Second, to provide an improved flexible pipe in which the joints are secure and at the same time permit easy and free movement.

Third, to provide an improved flexible pipe in which the coacting parts of the joint may be quickly joined or released as occasion may require.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail side view of a train pipe embodying the features of my invention, parts being shown conventionally.

Fig. II is a detail plan view of parts of the structure shown in Fig. I.

Fig. III is a detail longitudinal section through one of the joints on a line corresponding to line 3—3 of Fig. I.

Fig. IV is a transverse section on a line corresponding to line 4—4 of Fig. I.

Fig. V is a detail plan view showing the arrangement of the detachable couplings for the train pipe, the detachable couplings being preferably such as are now commonly employed, the same being conventionally illustrated.

In the drawing similar reference characters refer to similar parts throughout the several views, and the sectional views are taken looking in the direction of the little arrows at the ends of the section lines.

Referring to the drawing, 1 represents a car body and 2 the air or steam pipe mounted thereon. It will be understood that it is now common practice to attach flexible rubber hose to these train pipes, the hose being provided with couplings shown conventionally at 3, Fig. V. My improved flexible pipe is designed to be substituted for such flexible hose and provided with a coupling member 3 adapted to coact with a similar coupling member carried by another flexible pipe embodying my improvements or a flexible hose pipe of the usual form, thus enabling the use of cars equipped with my improved flexible pipe in conjunction with cars equipped with the usual flexible hose pipe.

In the structure illustrated I provide pipe sections 4 and 5, the pipe section 5 being provided with the usual coupling 3. These pipe sections are joined by a pair of coacting joint members 6 and 7 internally threaded to receive the pipe sections as shown in Fig. III.

The female coupling member 6 is provided with a socket 8, while the male coupling member is provided with a nipple 9 rotatably fitting within the female member. The socket 8 is provided with an annular gasket seat 10 with its smaller end outward, the diameter of the smaller end of the gasket being such that it is out of contact with the walls of the socket, as shown in Figs. III and IV. The gasket is shaped so that its inner end 12 faces outwardly and fits the wall of the socket.

I preferably provide a bearing ring 13 formed of hard fiber. This bearing ring rests upon the gasket and is beveled on its outer side so as to have a relatively narrow bearing contact surface 14 for the end of the nipple. The object of this bearing ring is to take the wear from the gasket and to reduce friction as the joint members rotate relative to each other.

By shaping the gasket as I have shown and described, the pressure of the air or steam tends to force the gasket outwardly, holding it firmly in contact with the socket walls and also where the bearing ring is present to increase the pressure of the bearing ring against the end of the nipple, the pressure thus assisting in producing a perfect sealed joint. The gasket is of such length as to support the nipple with its shoulder 15 out of contact with the female member or, in other words, the male member is supported laterally by the gasket.

To retain the parts in coacting relation I provide a yoke-like retaining member 16, the arm 17 of which is arranged through a boss 18 on the female coupling member and threaded to receive the nut 19. The male coupling member is provided with a seat 20 open at one side so that the yoke may be swung into the same and engage the male coupling member at 21, which is in alinement with the rotative axis of the joint member.

A pin 22 retains the arm in engagement with the seat. In order to provide for movement in two planes I provide a coupling member 23 having a male joint nipple, such as described, at one end and a joint socket at the other end.

The coupling members 6 and 7 of the type described are arranged to coact with these joint members,—see Fig. I. This provides for the swinging of the pipe in a horizontal plane as well as a plane longitudinally of the train pipe.

The number of joints in a pipe could be increased, but I have found in use on railway trains that an arrangement of joints as illustrated in Fig. I is satisfactory.

I have illustrated and described my improvements as I have embodied the same in flexible pipe for air and steam service on railway trains. I have not attempted to illustrate or describe other modifications or adaptations thereof as I believe the disclosure made will enable those skilled in the art to which my invention relates to embody or adapt the same as may be desired.

Having thus described my invention, what I claim as new and desire to secure by Letters Patent, is:

1. In a flexible pipe, the combination of a female joint member having a laterally facing socket with an annular gasket seat therein, a male joint member having a laterally projecting nipple rotatable within said socket and a retaining yoke seat on its rear side disposed axially relative to said nipple, a conical gasket disposed on said gasket seat within said socket with its smaller end outward, a nipple bearing ring beveled on its outer side disposed on said gasket to engage the end of said nipple, and a retaining yoke, one arm of which is rotatably mounted on said female coupling member, so that its other arm may be swung into said yoke seat on the male coupling member and engage the same axially of said nipple, the supporting arm of said retaining yoke being threaded and provided with an adjusting nut.

2. In a flexible pipe, the combination of a female joint member having a laterally facing socket with an annular gasket seat therein, a male joint member having a laterally projecting nipple rotatable within said socket and a retaining yoke seat on its rear side disposed axially relative to said nipple, a conical gasket disposed on said gasket seat within said socket with its smaller end outward, and a retaining yoke, one arm of which is rotatably mounted on said female coupling member, so that its other arm may be swung into said yoke seat on the male coupling member and engage the same axially of said nipple, the supporting arm of said retaining yoke being threaded and provided with an adjusting nut.

3. In a flexible pipe, the combination of a female joint member having a laterally facing socket with an annular gasket seat therein, a male joint member having a laterally projecting nipple rotatable within said socket and a retaining yoke seat on its rear side disposed axially relative to said nipple, said seat being open at one side, a gasket disposed on said gasket seat within said socket, a retaining yoke, one arm of which is rotatably mounted on said female coupling member, so that its other arm may be swung into said yoke seat on the male coupling member and engage the same axially of said nipple, the supporting arm of said retaining yoke being threaded and provided with an adjusting nut, and a retaining pin for said yoke.

4. In a flexible pipe, the combination of a female joint member having a laterally facing socket with an annular gasket seat therein, a male joint member having a laterally projecting nipple rotatable within said socket and a retaining yoke seat on its rear side disposed axially relative to said nipple, a gasket disposed on said gasket seat within said socket, a retaining yoke, one arm of which is rotatably mounted on said female coupling member, so that its other arm may be swung into said yoke seat on the male coupling member and engage the same axially of said nipple, the supporting arm of said retaining yoke being threaded and provided with an adjusting nut.

5. In a flexible pipe, the combination of a female joint member having a laterally facing socket with gasket seat therein, a male joint member having a laterally projecting nipple rotatable within said socket, a conical annular gasket disposed on said gasket seat within said socket with its smaller end outward and out of contact with the wall of said socket, a nipple bearing ring beveled on its outer side disposed on said gasket to engage the end of said nipple, and a coupling means engaging said male coupling member axially of its said nipple.

6. In a flexible pipe, the combination of a female joint member having a laterally facing socket with gasket seat therein, a male joint member having a laterally projecting nipple rotatable within said socket, a conical annular gasket disposed on said gasket seat within said socket with its smaller end outward and out of contact with the wall of said socket, a nipple bearing ring beveled on its outer side disposed on said gasket to engage the end of said nipple, and a coupling means for said members permitting rotative movement thereof.

In witness whereof I have hereunto set my hand and seal in the presence of two witnesses.

JOHN HENRY PHILLIPS, JR. [L. S.]

Witnesses:
F. W. Fox,
Howard Hackett.